US010860303B2

United States Patent
Sirois et al.

(10) Patent No.: US 10,860,303 B2
(45) Date of Patent: Dec. 8, 2020

(54) SELECTIVE OPERATING SYSTEM PATCHING/UPDATING (71) Applicant: Nintendo Co. Ltd., Kyoto (JP)

(72) Inventors: Jeffrey Sirois, Redmond, WA (US); Eugene Borisov, Redmond, WA (US); Eugene Kwon, Redmond, WA (US)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 13/870,960

(22) Filed: Apr. 25, 2013

(65) Prior Publication Data
US 2014/0325498 A1 Oct. 30, 2014

Related U.S. Application Data (60) Provisional application No. 61/849,831, filed on Apr. 24, 2013.

(51) Int. Cl.
*G06F 8/65* (2018.01)
(52) U.S. Cl.
CPC ..................... *G06F 8/65* (2013.01)
(58) Field of Classification Search
CPC .......................................................... G06F 9/28
See application file for complete search history.

(56) References Cited

U.S. PATENT DOCUMENTS

| 6,745,385 | B1* | 6/2004 | Lupu | G06F 9/44521 |
| | | | | 717/148 |
| 8,219,983 | B1* | 7/2012 | Sobel | G06F 8/60 |
| | | | | 717/126 |
| 8,296,758 | B2* | 10/2012 | Kabadiyski | G06F 8/60 |
| | | | | 717/168 |
| 9,038,057 | B2* | 5/2015 | Goebl | G06F 21/10 |
| | | | | 717/173 |
| 2003/0167463 | A1* | 9/2003 | Munsil | G06F 9/445 |
| | | | | 717/170 |
| 2004/0210653 | A1* | 10/2004 | Kanoor | G06F 8/65 |
| | | | | 709/223 |
| 2004/0255283 | A1* | 12/2004 | Rudelic | G06F 8/65 |
| | | | | 717/151 |

(Continued)

OTHER PUBLICATIONS

Angelos D Keronytis, Patech on Demand Saves Even more Time, Aug. 2004, p. 94-96.*

(Continued)

*Primary Examiner* — Lewis A Bullock, Jr.
*Assistant Examiner* — Mohammad H Kabir
(74) *Attorney, Agent, or Firm* — Nixon & Vanderhye PC (57) ABSTRACT

An application typically runs on top of an operating system. Some computing device have the ability to reboot and load a different operating system whenever an application or set of applications is run. If an old application requires an old operating system version, it is possible to load that OS instead. Every application can have its own version of the operating system. Only new applications or a small set of applications need to use the new OS—all the old applications may run their own older version of the OS. Patches or software updates can be applied only for particular applications. Other applications that need the same base OS but don't need the patch can skip using the patch. It is possible to determine what version the application is and selectively apply the patch based on the version of the application.

18 Claims, 3 Drawing Sheets

(56) References Cited

U.S. PATENT DOCUMENTS

| | | | | |
|---|---|---|---|---|
| 2006/0075401 | A1* | 4/2006 | Smegner | G06F 8/65 717/174 |
| 2006/0130046 | A1* | 6/2006 | O'Neill | G06F 8/654 717/168 |
| 2007/0011302 | A1* | 1/2007 | Groner | G06F 11/1076 709/224 |
| 2007/0136297 | A1* | 6/2007 | Choe | G06F 21/57 |
| 2007/0250595 | A1* | 10/2007 | Landfield | 709/218 |
| 2008/0022274 | A1* | 1/2008 | Shieh | G06F 8/61 717/174 |
| 2008/0115134 | A1* | 5/2008 | Elliott | G06F 9/4856 718/101 |
| 2008/0134176 | A1* | 6/2008 | Fitzgerald | G06F 9/45537 718/1 |
| 2008/0256564 | A1* | 10/2008 | Fathalla | 719/331 |
| 2008/0263350 | A1* | 10/2008 | Haverkamp | G06F 8/65 713/2 |
| 2009/0100419 | A1* | 4/2009 | Childress | G06F 8/65 717/171 |
| 2009/0150525 | A1* | 6/2009 | Edgett | H04L 63/08 709/220 |
| 2011/0055821 | A1* | 3/2011 | Tanaka | G06F 8/65 717/170 |
| 2012/0023490 | A1* | 1/2012 | Goebl | G06F 21/10 717/173 |
| 2012/0227061 | A1* | 9/2012 | Hunt | G06F 9/45558 719/331 |
| 2013/0086573 | A1* | 4/2013 | Moritzen | G06F 8/65 717/171 |
| 2013/0152068 | A1* | 6/2013 | Crk | G06F 8/68 717/172 |
| 2013/0205406 | A1* | 8/2013 | Moskowitz | 726/27 |
| 2013/0283252 | A1* | 10/2013 | Mannarswamy | G06F 8/656 717/168 |
| 2014/0033271 | A1* | 1/2014 | Barton et al. | 726/1 |
| 2014/0121488 | A1* | 5/2014 | Budiman | 600/365 |
| 2014/0208302 | A1* | 7/2014 | Paul et al. | 717/170 |
| 2014/0298452 | A1* | 10/2014 | Heng et al. | 726/22 |
| 2015/0046917 | A1* | 2/2015 | Tagliabue | G06F 3/1285 717/174 |
| 2015/0135170 | A1* | 5/2015 | Murray | G06F 9/45516 717/148 |

OTHER PUBLICATIONS

Angelos D Keronytis, Patech on Demand Saves Even more Time, Aug. 2004, p. 94-97.*

Porter et al, "Rethinking the Library OS from the Top Down", ASPLOS'11 Mar. 5-11, 2011, Newport Beach, California, USA.

* cited by examiner

SELECTIVE OPERATING SYSTEM PATCHING/UPDATING

CROSS-REFERENCES TO RELATED APPLICATIONS

This non-provisional application claims priority from U.S. Provisional Application No. 61/849,831 filed Apr. 24, 2013. The disclosure of the prior application is incorporated herein in its entirety by reference.

FIELD

The technology herein relates to software updating, and more particularly to updating the software of a computing device operating system. Still more particularly, the technology herein relates to selectively updating an operating system code base depending on which particular application the computing device is requested to run.

BACKGROUND AND SUMMARY

Many modern consumer electronic devices are actually miniaturized computers. The hand-held smart phone, music player, tablet, video game system or other consumer electronic device that you may be carrying in your pocket or purse has more computing power than bygone era so-called "mainframe computers that occupied entire rooms. The trend of packing even more computing power into smaller and smaller packages is likely to continue as even more electronic components can be further miniaturized and placed onto the same integrated circuit.

Most computing devices can't do much of anything without software. Generally speaking, computing system software includes two different components: an operating system and one or more applications. The applications typically provide application level functionality the user is interested in: for example games, GPS mapping, calendar, web browser, email, and many others. Generally speaking, the operating system is the foundation software on which the applications depend. The operating system typically provides all sorts of basic functionality controlling the allocation and usage of hardware resources such as for example, memory, central processing unit (CPU), time, disc space and peripheral devices such as displays, keyboards, cameras, microphones and the like. Example popular operating systems as of this filing include Microsoft Windows, Apple iOS, Google Android, Apple MacOS, UNIX, and others. By the time this patent issues, there are likely to be others.

When an application runs on the computing device, the application calls functionality of the operating system to accomplish a range of tasks the application needs done in order to complete its mission. For example, the application might request the operating system to display certain text and/or images on a display, or request the operating system to play certain sounds through a loudspeaker or headset. The application might rely on the operating system to provide user input via a keyboard, microphone, touch screen or other user input device. The operating system also manages the memory, processing and other resources of the computing device so that the application can access and use such resources without conflicting with other applications that may also need to have access to those same resources.

While an imperfect analogy, one could think of the operating system as the basic infrastructure of a theater and the applications as the performing troupes that perform in the theater. A theater typically provides a variety of basic resources used by any performance—for example a stage, lights, a sound system, dressing rooms, stage hands, ticket takers, etc. Like an operating system, the theater and its staff makes all these various resources available and, like an application, each individual performing group can select and use whichever resources it requires. For example, both a rock band performing on Tuesday night and a stand-up comedian performing on Wednesday night will stand on the same stage, use the same sound system, and the same stage lights. However, the stand-up comedian may need only one spotlight, whereas the rock band may need three or four lights. Some performing groups might need elaborate stage sets, whereas others need none. A choir might need sound baffles and risers whereas a drama production may need a different setup. A school group may not need ticket takers while a charity performance may.

In a somewhat similar manner, each application that is downloaded or otherwise activated to run on a computing device runs on top of the operating system. The operating system is typically designed to provide all of the basic functionality that most applications will need for support. This approach increases efficiency and reduces development time and effort by eliminating the need for the developer of each application to "reinvent the wheel". The operating system also can be used to insulate application developers from the complexity and details of the particular computing resources available on any given particular computing device.

In most such systems, there is only one operating system. This typically means that all applications must be compatible with that single operating system and run in harmony with it. When the operating system is updated, the operating system designers typically take great pains to ensure all pre-existing applications will work with the updated version of the operating system. In other words, the updated operating system must typically be backwards-compatible with all pre-existing applications so that those applications can continue to run successfully even after the operating system is updated. This approach supports the value of previously-released applications while permitting newer applications to take advantage of operating system enhancements. Unfortunately, there is also substantial cost involved in this approach. In particular, regression testing is necessary to ensure that all of the preexisting applications will continue to work with the new operating system release. Depending on the computing device and associated applications, regression testing could require testing of hundreds or thousands of different applications to ensure the new operating system release remains compatible. Such processes can be very costly and time-consuming.

Some consumer electronic devices and other computing systems may adopt a different approach. For example, certain computing devices (e.g., certain video game systems such as for example Nintendo Wii and Wii U) can be designed to run only one application at a time. When an application is started, such computing devices may be initialized ("re-booted") to a new initialization state. Such re-starting or re-booting can reload the operating system along with the application to be executed. This kind of initialization/rebooting offers an interesting opportunity. If an old application requires an old version of the operating system or even a special version of the operating system, it is possible to load that particular required operating system version instead of some other (or more recent) version. Theoretically, every application can have its own customized version of the operating system. This type of arrangement has certain advantages.

For example, suppose there are thousands of applications released during the lifecycle of the computing device. Now suppose that in the middle of the computing device's lifecycle, system designers wish to add a new feature to the operating system or fix a bug within the operating system. In a typical development environment, it would be necessary to test all of the thousands of pre-existing applications with the new operating system version to ensure backwards compatibility. This constitutes a tremendous cost in regression analysis, especially given the rate at which new features and bug fixes may be implemented in the operating system. Under the alternative approach, if the system designers wish to release a new operating system with new features and/or bug fixes, and only new applications or some small subset of applications will use that new operating system version, it is not necessary to also ensure that the old applications can also successfully run on the new operating system version. Rather, when a new application is started, the new operating system will load with it. In contrast, when an older application is started, the older version of the operating system will load with it. In this way, pre-existing applications can remain undisturbed whereas newer applications can take advantage of new features and/or bug fixes in the operating system without requiring any changes to the pre-existing applications. Because the old operating system version will continue to be available to support the existing applications, there is no need to perform regression testing and the system designers will have good confidence that the existing applications will continue to work.

While such an arrangement provides many theoretical advantages, there are some practical problems. First, there is only a finite amount of storage space available on any computing device. In small relatively inexpensive consumer electronics devices such as handheld smart phones, tablets, video game systems and the like, the amount of storage space may be relatively small. In an extreme case, if thousands of applications written to run on a particular computing device each had their own specialized or individualized operating system, it would be necessary to make thousands of versions of the operating system available to the device so that any version is available where any particular application requires it. As a practical matter, there may simply not be enough space to store all of those different operating system versions in non-volatile or other memory on the computing device. While it might be possible to obtain any desired operating system version by requesting it from a server and downloading it on demand over a network, the download time might be a problem. Many users do not want to wait for a long download each time they start a new application.

The example non-limiting technology herein provides a new operating system patching approach that solves this problem. In an example of non-limiting embodiments, the computing device stores or otherwise has available to it some finite number of different versions of the operating system (at least one but less than the total number of different possible versions that may be available or required now or in the future). Then, patches are selectively applied on demand depending on the application(s) being run to customize a particular operating system version to make it compatible with a particular application(s) the user wishes to run. In this way, many applications may share the same basic version of the operating system, but in the event that a particular application is not compatible, the operating system can be patched as needed based on the particular requirements of that particular application.

For example, suppose an application is released for use with a "standard" or basic version of the operating system, but user experience indicates that the application has a bug that causes it to be incompatible in some way with the standard operating system version. While it may be straightforward to modify or repair the operating system to eliminate the bug, such a repair if enforced against all other possible applications might cause dysfunctionality in some of those other applications. The exemplary non-limiting operating system patch capability can solve this problem. Suppose there are N applications that have been released, and only one of them has a bug requiring modification of the operating system. The system designers can release an operating system patch that, once applied, in response to running that particular application with the bug, will eliminate or ameliorate the bug. The same computing device meanwhile can run other applications (or even other versions of the same application) without applying that particular patch to the operating system.

In one non-limiting example implementation, a request to run a particular application may automatically cause a "base" version of the operating system plus a particular patch to be loaded. The patch modifies or customizes the operating system so that it is now compatible with and works functionally with the particular application being run. When a different application is loaded, a different patch required by that other application can be loaded with the operating system—or if the second application does not require any patch, no patch needs to be applied and the "base" operating system can be run unpatched.

In one example non-limiting implementation, a patch may constitute a piece of code (for example object code, interpreted code or other executable code) that is inserted into an executable program as a fix for a bug, to enhance or customize the functionality of the operating system, or for other reasons. A patch may thus provide modification or customization of the operating system that can be selectively invoked by the running of an application. For example, in example non-limiting contexts herein, a patch may enhance or otherwise change the operating system functionality without necessarily repairing a defect or bug—although repairing a defect or bug is one of the things a patch can be used to effect. Thus, a patch in the example non-limiting embodiments herein can represent any difference between a particular operating system code base and a desired operating system code base. Such patches may also be referred to as operating system software updates.

Example non-limiting advantages of the technology herein include saving storage space on a computing device while still allowing a high degree of flexibility for loading different operating system versions on demand depending on the application. Such example non-limiting arrangements thus achieve high degrees of compatibility while avoiding complex expensive regression testing. Using the example non-limiting technology herein, it is possible to modify the operating system for a particular application or application title or even for a particular version of an application.

The example non-limiting implementation does not necessarily require having one version of the operating system binaries that individually check to see if the currently running game needs a patch or not. Rather, there is no need to change any binary related to an application that doesn't need a fix. This reduces the risk and regression testing when deploying a new patch. In one example non-limiting implementation, applications that don't need the patch see absolutely no changes.

BRIEF DESCRIPTION OF THE DRAWINGS

These and other features and advantages will be better and more readily understood by referring to the following detailed description of example non-limiting embodiments in connection with the drawings, of which.

DETAILED DESCRIPTION

Figure 1:
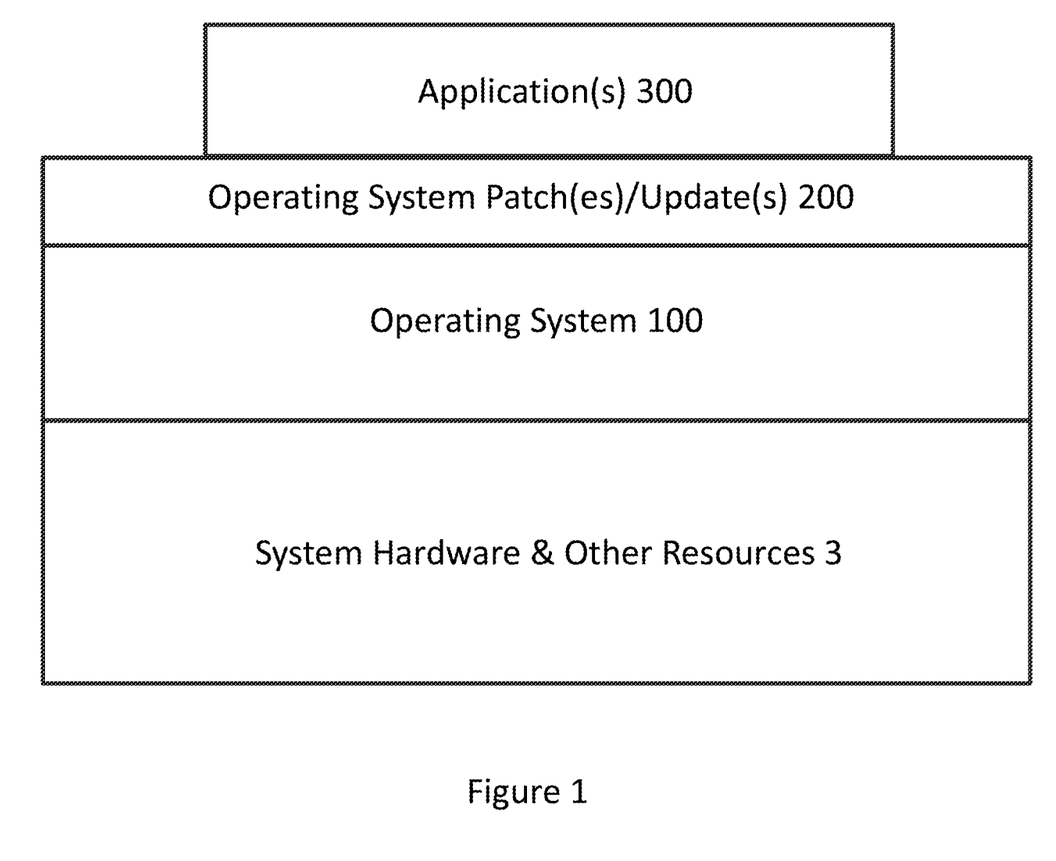
FIG. 1 is a block diagram of an example non-limiting system.

FIG. 1 is a high level block diagram of an example non-limiting system. Hardware and other resources 3 of a system may include at least one processor that executes an operating system 100. Operating system 100 includes an Application Programming Interface ("API") that one or more applications 300 can call to invoke functionality provided by the hardware or other resources 3 including input/output functions, display functions, processing functions or any other type of functions. One or more patches or updates 200 are used to patch, replace or update code of operating system 100 to repair, augment, enhance, substitute or otherwise change functionality provided by the operating system 100. In one particular non-limiting example, operating system 100 can be any of a number of different versions can be loaded as needed. Similarly, the patch(es)/update(s) 200 can be any of a number of different versions and can be loaded to patch or update the operating system 100 as needed. The patch(es)/update(s) 200 can be cumulative or independent such that one or a number of different patch(es)/update(s) 200 may be applied to the operating system 100.

Figure 2:
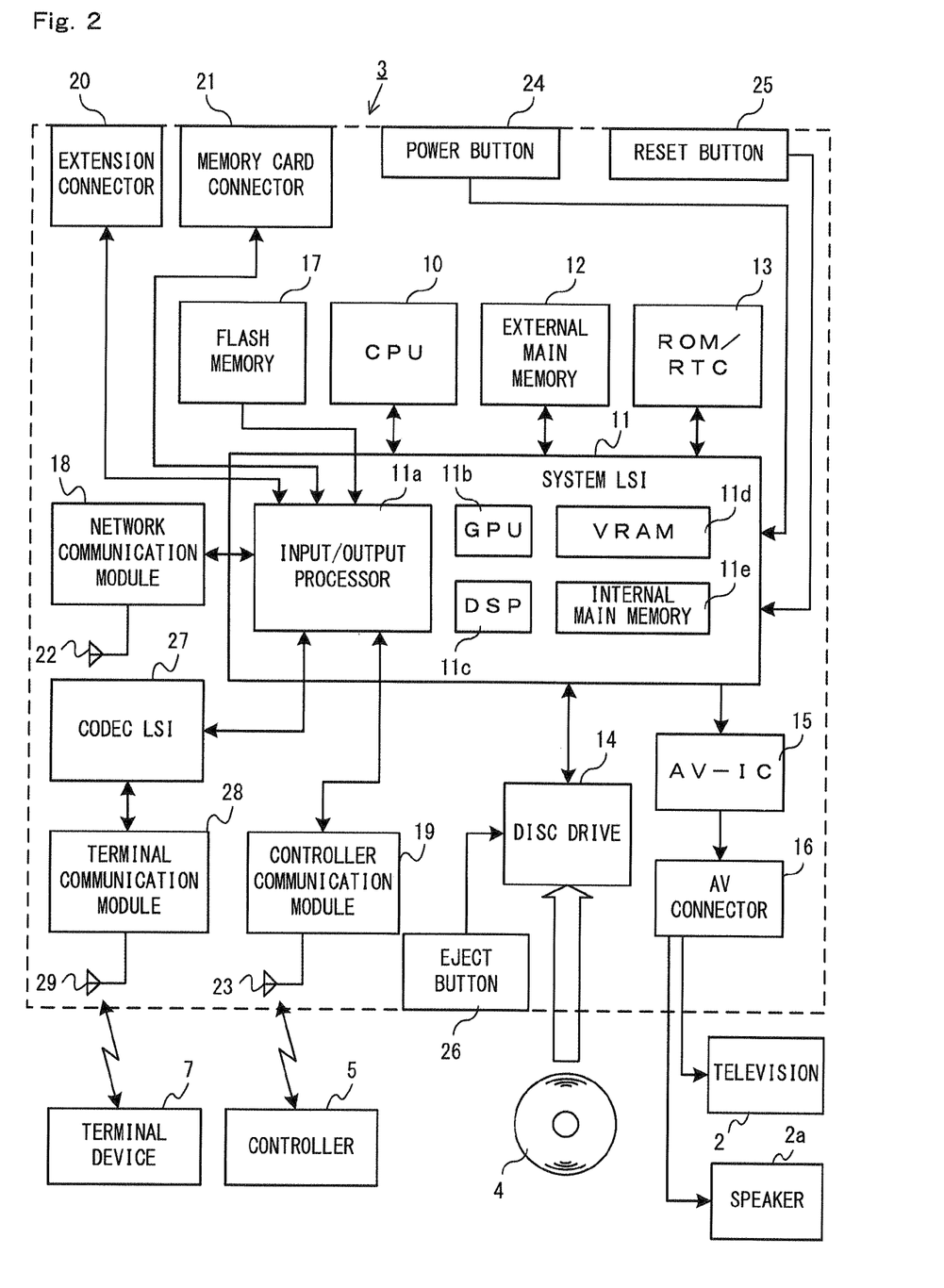
FIG. 2 is a more detailed block diagram of an example non-limiting system.

FIG. 2 is a more detailed block diagram illustrating an internal configuration of an example non-limiting computing device 3. Computing device 3 can provide any desired form factor including but not limited to a handheld computing device, a laptop computer, a home video game system, a smart phone, a tablet, a cloud computing device, an embedded processing device or any other sort of device or other appliance.

The computing device 3 includes a CPU (Central Processing Unit) 10, a system LSI 11, external main memory 12, a ROM/RTC (real time clock) 13, a disc drive 14, and an AV-IC 15.

The CPU 10 performs software controlled processes by executing application programs stored, for example, on the optical disc 4 or in external main memory 12 or flash memory 17. The CPU 10 is connected to the system LSI 11. The external main memory 12, the ROM/RTC 13, the disc drive 14, and the AV-IC 15, as well as the CPU 10, are connected to the system LSI 11. The system LSI 11 performs processes for controlling data transmission between the respective components connected thereto, generating images to be displayed, acquiring data from an external device(s), and the like. The internal configuration of the system LSI 11 will be described below.

The external main memory 12 is of a volatile type and stores an application program 300 such as a game program, a word processing program, a browser, or any other application read from the optical disc 4 and/or from flash memory 17, and various data. The external main memory 12 is used as a work area and a buffer area for the CPU 10. The ROM/RTC 13 includes a ROM (a so-called boot ROM) incorporating a boot program including an operating system program 100 for the computing device 3, and a clock circuit (RTC: Real Time Clock) for counting time. The disc drive 14 reads program data, image data, and the like from the optical disc 4, and writes the read data into internal main memory 11e or the external main memory 12.

The system LSI 11 includes an input/output processor (I/O processor) 11a, a GPU (Graphics Processor Unit) 11b, a DSP (Digital Signal Processor) 11c, VRAM (Video RAM) 11d, and the internal main memory 11e. Although not shown in the figures, these components 11a to 11e are connected with each other through an internal bus.

The GPU 11b, acting as a part of a rendering mechanism, generates images in accordance with graphics commands (rendering commands) from the CPU 10. The VRAM 11d stores data (data such as polygon data and texture data) to be used by the GPU 11b to execute the graphics commands. When images are generated, the GPU 11b generates image data using data stored in the VRAM 11d. Note that in the present example embodiment, the computing device 3 generates both images to be displayed on the display 2 and images to be displayed on the terminal device 7.

The DSP 11c, functioning as an audio processor, generates sound data using sound data and sound waveform (e.g., tone quality) data stored in one or both of the internal main memory 11e and the external main memory 12. In one example embodiment, sounds to be generated are classified into two types, one being outputted from the speaker of the display 2, the other being outputted from speakers of the terminal device 7. Among the images and sounds generated by the computing device 3 as described above, both image data and sound data to be outputted from the display 2 are read out by the AV-IC 15. The AV-IC 15 outputs the read-out image data to the display or other display 2 via an AV connector 16, and outputs the read-out sound data to the speakers 2a provided in the display 2. Thus, images are displayed on the display 2, and sounds are outputted from the speakers 2a. Note that the computing device 3 and the display 2 may be connected in any manner, and a control command for controlling the display 2 may be transmitted to the display 2 by the computing device 3 in a wired or wireless manner. For example, an HDMI cable, which supports the HDMI (high-definition multimedia interface) standard, may be used. The HDMI standard allows a device to control another device connected thereto on the basis of a function called CEC (consumer electronics control). Accordingly, in the case where the HDMI cable is used so that the computing device 3 can control the display 2, the computing device 3 can turn on the display 2 or switch between inputs to the display 2 at appropriate times.

Among the images and sounds generated by the computing device 3, both image data and sound data to be outputted by the terminal device 7 are transmitted to the terminal device 7 by the input/output processor 11a, etc.

The input/output processor 11a exchanges data with components connected thereto, and downloads data from an external device(s). The input/output processor 11a is connected to the flash memory 17, a network communication module 18, a controller communication module 19, an expansion connector 20, a memory card connector 21, and a codec LSI 27. Furthermore, an antenna 22 is connected to the network communication module 18. An antenna 23 is connected to the controller communication module 19. The codec LSI 27 is connected to a terminal communication module 28, and an antenna 29 is connected to the terminal communication module 28.

The computing device 3 is capable of connecting to a network such as the Internet to communicate with an external information processing apparatus (e.g., another computing device or a server). Specifically, the input/output processor 11a can be connected to a network such as the Internet via the network communication module 18 and the antenna 22 to communicate with other information processing apparatuses connected to the network. The input/output processor 11a regularly accesses the flash memory 17, and detects the presence or absence of any data to be transmitted to the network, and when detected, transmits the data to the network via the network communication module 18 and the antenna 22. Further, the input/output processor 11a receives data transmitted from the external information processing apparatuses and data downloaded from a download server via the network, the antenna 22 and the network communication module 18, and stores the received data in the flash memory 17. The CPU 10 executes a program so as to read data stored in the flash memory 17 and use the data, as appropriate, in the program. The flash memory 17 may store save data (e.g., result data or unfinished data) of an application using the computing device 3 in addition to data exchanged between the computing device 3 and the external information processing apparatuses. Moreover, the flash memory 17 may have a program stored therein.

Furthermore, the computing device 3 is capable of receiving operation data from the controller 5. Specifically, the input/output processor 11a receives operation data transmitted from the controller 5 via the antenna 23 and the controller communication module 19, and stores it (temporarily) in a buffer area of the internal main memory 11e or the external main memory 12.

Furthermore, the computing device 3 is capable of exchanging data, for images, sound, etc., with the terminal device 7. When transmitting images to the terminal device 7 for display, the input/output processor 11a outputs image data generated by the GPU 11b to the codec LSI 27. The codec LSI 27 performs a predetermined compression process on the image data from the input/output processor 11a. The terminal communication module 28 wirelessly communicates with the terminal device 7. Accordingly, the image data compressed by the codec LSI 27 is transmitted by the terminal communication module 28 to the terminal device 7 via the antenna 29. In the present example embodiment, the image data transmitted from the computing device 3 to the terminal device 7 is image data used in an application, and the user experience can be adversely influenced if there is a delay in the images displayed in the. Therefore, the system avoids delay in transmitting image data from the computing device 3 to the terminal device 7. Therefore, in the present example embodiment, the codec LSI 27 compresses image data using a compression technique with high efficiency such as the H.264 standard, for example. Other compression techniques may be used, and image data may be transmitted uncompressed if the communication speed is sufficient. The terminal communication module 28 is, for example, a Wi-Fi certified communication module, and may perform wireless communication at high speed with the terminal device 7 using a MIMO (Multiple Input Multiple Output) technique employed in the IEEE 802.11n standard, for example, or may use other communication schemes.

Furthermore, in addition to the image data, the computing device 3 also transmits sound data to the terminal device 7. Specifically, the input/output processor 11a outputs sound data generated by the DSP 11c to the terminal communication module 28 via the codec LSI 27. The codec LSI 27 performs a compression process on the sound data as it does on the image data. Any method can be employed for compressing the sound data, and such a method uses a high compression rate but causes less sound degradation. Also, in another example embodiment, the sound data may be transmitted without compression. The terminal communication module 28 transmits compressed image and sound data to the terminal device 7 via the antenna 29.

Furthermore, in addition to the image and sound data, the computing device 3 transmits various control data to the terminal device 7 where appropriate. The control data is data representing an instruction to control a component included in the terminal device 7, e.g., an instruction to control lighting of a marker section or an instruction to control shooting by a camera. The input/output processor 11a transmits the control data to the terminal device 7 in accordance with an instruction from the CPU 10. Note that in the present example embodiment, the codec LSI 27 does not perform a compression process on the control data, but in another example embodiment, a compression process may be performed. Note that the data to be transmitted from the computing device 3 to the terminal device 7 may or may not be coded depending on the situation.

Furthermore, the computing device 3 is capable of receiving various data from the terminal device 7. As will be described in detail later, in the present example embodiment, the terminal device 7 transmits operation data, image data, and sound data. The data transmitted by the terminal device 7 is received by the terminal communication module 28 via the antenna 29. Here, the image data and the sound data from the terminal device 7 have been subjected to the same compression process as performed on the image data and the sound data from the computing device 3 to the terminal device 7. Accordingly, the image data and the sound data are transferred from the terminal communication module 28 to the codec LSI 27, and subjected to a decompression process by the codec LSI 27 before output to the input/output processor 11a. On the other hand, the operation data from the terminal device 7 is smaller in size than the image data or the sound data and therefore is not always subjected to a compression process. Moreover, the operation data may or may not be coded depending on the situation. Accordingly, after being received by the terminal communication module 28, the operation data is outputted to the input/output processor 11a via the codec LSI 27. The input/output processor 11a stores the data received from the terminal device 7 (temporarily) in a buffer area of the internal main memory 11e or the external main memory 12.

Furthermore, the computing device 3 can be connected to other devices or external storage media. Specifically, the input/output processor 11a is connected to the expansion connector 20 and the memory card connector 21. The expansion connector 20 is a connector for an interface, such as a USB or SCSI interface. The expansion connector 20 can receive a medium such as an external storage medium, a peripheral device such as another controller, or a wired communication connector which enables communication with a network in place of the network communication module 18. The memory card connector 21 is a connector for connecting thereto an external storage medium such as a memory card (which may be of a proprietary or standard format, such as SD, miniSD, microSD, Compact Flash, etc.). For example, the input/output processor 11a can access an external storage medium via the expansion connector 20 or the memory card connector 21 to store data in the external storage medium or read data from the external storage medium.

The computing device 3 includes a power button 24, an optional reset button 25, and an eject button 26. The power button 24 and the optional reset button 25 (which may not be used in some embodiments) are connected to the system LSI 11. When the power button 24 is on, power is supplied from an external power source to the components of the computing device 3 via an AC adaptor (not shown). When the reset button 25 is pressed, the system LSI 11 restarts a boot (operating system) program of the computing device 3. The eject button 26 is connected to the disc drive 14. When the eject button 26 is pressed, the optical disc 4 is ejected from the disc drive 14.

In other example embodiments, some of the components of the computing device 3 may be provided as extension devices separate from the computing device 3. In this case, an extension device may be connected to the computing device 3 via the expansion connector 20, for example. Specifically, an extension device may include components as described above, e.g., a codec LSI 27, a terminal communication module 28, and an antenna 29, and can be attached to/detached from the expansion connector 20. Thus, by connecting the extension device to a computing device which does not include the above components, the computing device can communicate with the terminal device 7.

Example Selective Application of Operating System Software Updates

Figure 3:
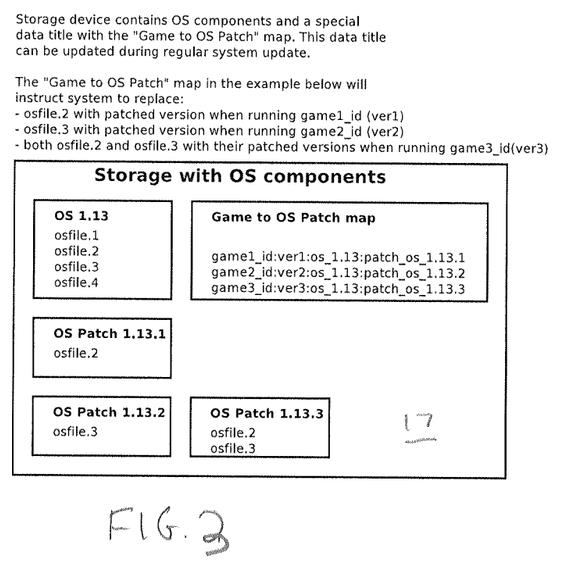
FIG. 3 shows example storage with operating system components.

In the example non-limiting implementation, when system 3 is originally turned on, it "boots" based on a boot program stored within read-only memory 13. CPU 10 then begins executing an operating system program stored within, for example, flash memory 17 in order to provide support and coordination for one or more applications that the CPU may be called upon to execute from flash memory 17 and/or disc 4. As shown in FIG. 3, the flash memory 17 may store various operating system ("OS") components. In the example shown, flash memory 17 may for example store files making up a particular operating system code base (e.g., "OS 1.13"). Flash memory 17 may also store various patches or software updates that may be selectively applied to the operating system code base depending on which application(s) the computing device 3 is called upon to execute. In the example shown, flash memory 17 stores three different patches or software updates: OS patch 1.13.1; OS patch 1.13.2; OS patch 1.13.23. In the example shown, these different OS patches or software updates are applied selectively depending upon which application(s) CPU 10 is called upon to execute. For example, if an application such as "game1" is executed, then OS patch 1.13.1 is applied to OS 1.13. On the other hand, if a different application "game2" is started, then OS patch 1.13.2 is applied to OS 1.13. Finally, if an application "game3" is executed, then a still different OS patch 1.13.3 is applied to OS 1.13 in order to execute that application. There could be yet another application such as "game4" that does not require any of these three patches but can be executed by OS 1.13 operating system code base without any update or modification.

The different patches or software updates can define any kind of modification or difference desired. For example, some patches may fix a bug or defect in the operating system code base. Other patches may modify the operation of the operating system code base to counteract or otherwise accommodate a bug or defect in the application, thereby masking or otherwise accommodating the bug or defect. Still other patches may enhance the operating system in particular ways that may be required by particular applications. Other patches may degrade or limit the operating system to provide better, more stable or less resource use by the operating system. Such selectively-applied software updates may be change or customize the operating system code base in any way that may be desirable or required by a particular application. More than one patch or software update can be applied, or the patches or software updates can be cumulative, or both.

Figure 4:
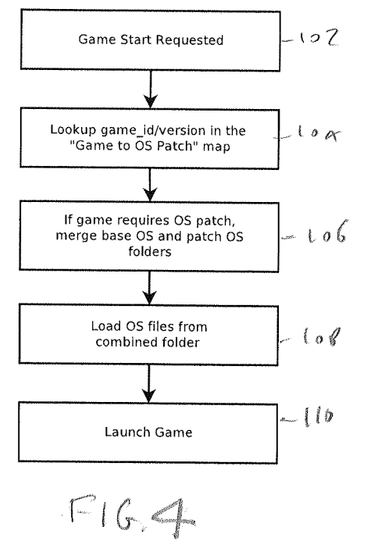
FIG. 4 is a flowchart of example non-limiting program controlled steps.

As shown in FIG. 4, when an application such as a game is started (block 102), the code that CPU 10 is executing may look up in a data structure "game to OS patch map" the particular application as well as the version of that application to determine if an entry is present (block 104). If the patch map indicates that the application requires an OS patch, the CPU 10 will merge the base OS and the patch OS folders (block 106) (such a merge can be done virtually e.g., with a symbolic link in one example implementation) and then load the OS file from the combined folder (block 108) to thereby launch this particular patched (if necessary) version of the operating system (block 108). The CPU 10 then launches the application (block 110) to run on top of the (patched) operating system version.

When the user requests the computer device 3 to run a different application, the steps of FIG. 3 are repeated with respect to that different application. For example, the result of the lookup of block 104 may vary considerably depending on which application is looked up. Therefore, block 106 will applying different patches (or no patch) depending on which application is to be run. In this way, it is possible to modify the operating system selectively depending on the particular application, application title (e.g., the title of a game such as "Legend of Zelda Twilight Princess", "Netflix" or the like), application version (e.g., 1.0, 1.5, 2.0, release of Apr. 25, 2013, etc.), set of applications or other aspects of the application to be run on top of the operating system.

As one example, suppose a new application version 1.0 is released that contains a bug, and that there is a way to update the operating system to accommodate or mask the bug. It would be possible to release such a patch and store an entry in the game to OS patch map so that whenever version 1.0 of that application is run, the OS patch update will be applied to the operating system. Then later, if the developer of the application releases version 2.0 of the application where the bug is fixed so that the OS patch is no longer required, the tame to OS patch map can be updated to indicate this such that whenever version 2.0 of the application is run, the OS patch update is not applied to the operating system.

As discussed above, the data structures stored in flash memory 17 may in some context store a library of different base operating system versions (e.g., OS 1.0, OS 1.1, OS 1.2, etc.). Each such operating system version may have its own set of patches. Different applications when requested may cause different base versions of the operating system and appropriate patches to be loaded as shown in FIG. 3. In one example non-limiting implementation, a root process that is part of the OS maintains the OS patch map, and exists to prevent the willy-nilly patching or other modification of the operating system. Conventional security techniques can be used to authenticate all patches before they are applied to ensure that the patches are authorized and have not been spoofed.

The operating system patches or updates can be obtained as a network update via a network such as the internet and/or via update data stored on the disc 4. For example, each time there is a network system update, any and all patches for any and all applications can be downloaded and stored in system 3 whether or not the system has any particular application residing on it. Similarly, when a new disc is released for use with system 3, that disc may contain code that will automatically update the library of OS components shown in FIG. 2. Even if the disc 4 stores only one application or no applications, that same disc may include OS components, patches and software updates for other applications not included on the disc so that if and when those other applications are loaded either through different discs 4 or through download into flash memory 17 or otherwise, those operating system components can already be available on system 3 for selective use by such applications. Alternatively, system 3 can obtain patches or software updates on demand on an as-needed basis over a network such as the Internet or any other data communications network whenever a new application or application version is run on system 3.

While the above description is directed to what are believed to be the most practical and preferred non-limiting embodiments, the invention is not to be limited to any detailed embodiments but rather is intended to cover various modifications and equivalent arrangements included within the spirit and scope of the claims.

What is claimed is:

1. A computer-implemented method of a computing device executing different applications on top of a computing device operating system (OS), the method comprising:
   receiving a first request to run a first application on the computing device operating system;
   determining the attribute of the requested first application;
   determining, with a computing device processor in response to the received first request, whether a first operating system patch for patching the operating system to run said first application is available, wherein the determining whether a patch is available involves using the determined attribute of the requested first application in a stored application-to-operating-system-patch map to select a first operating system patch, based on the attribute of the first application;
   if it is determined that a first operating system patch for said first application is available, selectively applying by symbolically linking the base file of the OS with the folders of the first operating system patch and loading the combined patch operating system;
   in response to loading the combined patch operating system, loading and executing the first application on the patched operating system;
   receiving a second request to run on the computing device operating system a second application different from the first application;
   determining the attribute of the requested second application;
   determining, with a computing device processor in response to the received second request, whether a second operating system patch, different from the first operating system patch, for patching the operating system to run said second application is available, wherein the determining whether a patch is available involves using the determined attribute of the requested second application in a stored application-to-operating-system-patch map to select a stored second operating patch, based on the attribute of the second application;
   if it is determined that a second operating system patch for said second application is available, selectively applying by symbolically linking the base file of the OS with the folders of the second operating system patch and loading the combined patch operating system; and
   in response to loading the combined patch operating system, loading and executing the second application on the patched operating system.

2. The method of claim 1 wherein each determining determines whether there is an available operating system patch that when applied will make the operating system compatible with the requested application.

3. The method of claim 1 further including detecting the version of the first application and selecting between operating system patches to apply in response to the detected first application version.

4. The method of claim 1 further including authenticating the selected first patch before selectively applying said patch.

5. The method of claim 1 further including retrieving the selectively-applied patches on demand.

6. The method of claim 5 wherein the retrieving is over a network.

7. The method of claim 5 wherein the retrieving is from a memory device.

8. The computer-implemented method of claim 1 wherein the computing device processor detects whether the first application has a bug, and in response to detecting that the first application has a bug, applies the first operating system patch to ameliorate the bug.

9. The computer-implemented method of claim 1 further including selecting, based on the first application, between different base versions of the operating system to run the first application.

10. The computer-implemented method of claim 1 wherein the patching modifies the operating system to replace or update the operating system to repair, augment, enhance, substitute or otherwise change operating system functionality.

11. The computer-implemented method of claim 1 wherein the patching with the first patch selectively customizes the operating system for the first application.

12. The method of claim 1 wherein the first application comprises a certain version of a software and the second application comprises a different version of the software.

13. A method of managing applications on a computing device of the type that runs the applications on top of an operating system (OS), the method comprising:
   receiving a first request to run a first application on the computing device operating system;
   determining the attribute of the requested first application;
   determining, by a root process that is part of the OS, in response to the received first request, whether a first operating system patch for patching the operating system to run said first application is available, wherein the determining whether a patch is available involves using the determined attribute of the requested first application in a stored application-to-operating-system-patch map to select a first operating system patch, based on the attribute of the first application;
   if it is determined that a first operating system patch for said first application is available, selectively applying by symbolically linking the base file of the OS with the folders of the first operating system patch and loading the combined patch operating system;
   in response to loading the combined patch operating system, loading and executing the first application on the patched operating system;
   receiving a second request to run on the computing device operating system a second application different from the first application;

13 determining the attribute of the requested second application;

determining, by a root process that is part of the OS, in response to the received second request, whether a second operating system patch, different from the first operating system patch, for patching the operating system to run said second application is available, wherein the determining whether a patch is available involves using the determined attribute of the requested second application in a stored application-to-operating-system-patch map to select a stored second operating patch, based on the attribute of the second application;

if it is determined that a second operating system patch for said second application is available, selectively applying by symbolically linking the base file of the OS with the folders of the second operating system patch and loading the combined patch operating system; and in response to loading the combined patch operating system, loading and executing the second application on the patched operating system.

14. A system comprising:

a user input device that receives a request to run at least a first application or a second application on top of an operating system;

a storage device that stores a plurality of alternative operating system code modifications;

a computer processor operatively coupled to the user input device and to the storage device, the computer processor being configured to:

receiving a first request to run a first application on the computing device operating system;

determining the attribute of the requested first application;

determining, by a root process that is part of the OS, in response to the received first request, whether a first operating system patch for patching the operating system to run said first application is available, wherein the determining whether a patch is available involves using the determined attribute of the requested first application in a stored application-to-operating-system-patch map to select a first operating system patch, based on the attribute of the first application;

if it is determined that a first operating system patch for said first application is available, selectively applying by symbolically linking the base file of the OS with the folders of the first operating system patch and loading the combined patch operating system;

in response to loading the combined patch operating system, loading and executing the first application on the patched operating system;

receiving a second request to run on the computing device operating system a second application different from the first application;

determining the attribute of the requested second application;

determining, by a root process that is part of the OS, in response to the received second request, whether a second operating system patch, different from the first operating system patch, for patching the operating system to run said second application is available, wherein the determining whether a patch is available involves using the determined attribute of the requested second application in a stored application-to-operating-system-patch map to select a stored second operating patch, based on the attribute of the second application;

14 if it is determined that a second operating system patch for said second application is available, selectively applying by symbolically linking the base file of the OS with the folders of the second operating system patch and loading the combined patch operating system; and in response to loading the combined patch operating system, loading and executing the second application on the patched operating system.

15. A non-transitory storage device storing a program comprising instructions that when executed by at least one computer processor control the computer processor to perform the following:

receiving a first request to run a first application on the computing device operating system;

determining the attribute of the requested first application;

determining, with a computing device processor in response to the received first request, whether a first operating system patch for patching the operating system to run said first application is available, wherein the determining whether a patch is available involves using the determined attribute of the requested first application in a stored application-to-operating-system-patch map to select a first operating system patch, based on the attribute of the first application;

if it is determined that a first operating system patch for said first application is available, selectively applying by symbolically linking the base file of the OS with the folders of the first operating system patch and loading the combined patch operating system;

in response to loading the combined patch operating system, loading and executing the first application on the patched operating system;

receiving a second request to run on the computing device operating system a second application different from the first application;

determining the attribute of the requested second application;

determining, with a computing device processor in response to the received second request, whether a second operating system patch, different from the first operating system patch, for patching the operating system to run said second application is available, wherein the determining whether a patch is available involves using the determined attribute of the requested second application in a stored application-to-operating-system-patch map to select a stored second operating patch, based on the attribute of the second application;

if it is determined that a second operating system patch for said second application is available, selectively applying by symbolically linking the base file of the OS with the folders of the second operating system patch and loading the combined patch operating system; and in response to loading the combined patch operating system, loading and executing the-second application on the patched operating system.

16. A computing system comprising:

a user input device that receives a request to run at least a first application or a second application on top of an operating system;

a storage device that stores a plurality of alternative operating system code modifications;

a computer processor operatively coupled to the user input device and to the storage device, the computer processor being configured to:

receiving a first request to run a first application on the computing device operating system;

determining the attribute of the requested first application;

determining, with the computing device processor in response to the received first request, whether a first operating system patch for patching the operating system to run said first application is available, wherein the determining whether a patch is available involves using the determined attribute of the requested first application in a stored application-to-operating-system-patch map to select a first operating system patch, based on the attribute of the first application;

if it is determined that a first operating system patch for said first application is available, selectively applying by symbolically linking the base file of the OS with the folders of the first operating system patch and loading the combined patch operating system;

in response to loading the combined patch operating system, loading and executing the first application on the patched operating system;

receiving a second request to run on the computing device operating system a second application different from the first application;

determining the attribute of the requested second application;

determining, with the computing device processor in response to the received second request, whether a second operating system patch, different from the first operating system patch, for patching the operating system to run said second application is available, wherein the determining whether a patch is available involves using the determined attribute of the requested second application in a stored application-to-operating-system-patch map to select a stored second operating patch, based on the attribute of the second application;

if it is determined that a second operating system patch for said second application is available, selectively applying by symbolically linking the base file of the OS with the folders of the second operating system patch and loading the combined patch operating system; and in response to loading the combined patch operating system, loading and executing the second application on the patched operating system.

17. A non-transitory storage device storing a program comprising instructions that when executed by at least one computer processor control the computer processor to perform the following:

receiving a first request to run a first application on the computing device operating system;

determining the attribute of the requested first application;

determining, by a root process that is part of the OS, in response to the received first request, whether a first operating system patch for patching the operating system to run said first application is available, wherein the determining whether a patch is available involves using the determined attribute of the requested first application in a stored application-to-operating-system-patch map to select a first operating system patch, based on the attribute of the first application;

if it is determined that a first operating system patch for said first application is available, selectively applying by symbolically linking the base file of the OS with the folders of the first operating system patch and loading the combined patch operating system;

in response to loading the combined patch operating system, loading and executing the first application on the patched operating system;

receiving a second request to run on the computing device operating system a second application different from the first application;

determining the attribute of the requested second application;

determining, by a root process that is part of the OS, in response to the received second request, whether a second operating system patch, different from the first operating system patch, for patching the operating system to run said second application is available, wherein the determining whether a patch is available involves using the determined attribute of the requested second application in a stored application-to-operating-system-patch map to select a stored second operating patch, based on the attribute of the second application;

if it is determined that a second operating system patch for said second application is available, selectively applying by symbolically linking the base file of the OS with the folders of the second operating system patch and loading the combined patch operating system; and in response to loading the combined patch operating system, loading and executing the second application on the patched operating system.

18. The non-transitory storage device of claim 17 further including storing in the map application version identifiers and associated operating system patch identifiers.

* * * * *